G. S. UDSTAD.
FLYING MACHINE.
APPLICATION FILED FEB. 21, 1910.

991,115.

Patented May 2, 1911.
7 SHEETS—SHEET 1.

Witnesses:
J. N. Alfred
J. H. Daggett

Inventor
George S. Udstad
by Poole & Brown
Attys

UNITED STATES PATENT OFFICE.

GEORGE S. UDSTAD, OF AURORA, ILLINOIS, ASSIGNOR OF ONE-HALF TO CHARLES LIETZ, OF AURORA, ILLINOIS.

FLYING-MACHINE.

991,115.  Specification of Letters Patent.  Patented May 2, 1911.

Application filed February 21, 1910. Serial No. 545,176.

*To all whom it may concern:*

Be it known that I, GEORGE S. UDSTAD, a citizen of the United States, and a resident of Aurora, in the county of Kane and State of Illinois, have invented certain new and useful Improvements in Flying-Machines; and I do hereby declare that the following is a full, clear, and exact description thereof, reference being had to the accompanying drawings, and to the letters of reference marked thereon, which form a part of this specification.

This invention relates to flying machines of that general type commonly known as "aeroplanes," wherein planes are provided to lift and sustain the machine as it is driven through the air by its propellers.

The invention consists of the construction and combination of parts hereinafter described and more particularly pointed out in the claims.

The frame of the machine is built of light but strong and rigid tubing, and comprises an upper frame 20 and a lower frame 21. Each frame is preferably rectangular in form, and the upper frame is braced laterally by the end rods 23, and longitudinally by two rods or tubes 24 located on each side of the medial line of the frame and running from end to end thereof in a direction parallel to the sides of the frame. The lower frame 21 is laterally braced by rods or tubes 25 which run transverse of the frame and are rigidly secured to the sides thereof. 26 represents the car body preferably made of tubing connected together so as to form a rigid construction. Said body is supported on the lower frame 21 by means of cross bars 27 which rise slightly above the plane of the lower frame and also serve to brace said frame. The upper frame 20 is supported from and secured to the lower frame by means of hangers 28 arranged at suitable intervals to rigidly brace the two frames apart. 29 represents supplemental supporting hangers or upright braces which run from the upper rail of the car body to the longitudinal braces 24 of the upper frame 20. A strong and rigid yet light construction is thus obtained.

Figure 1:
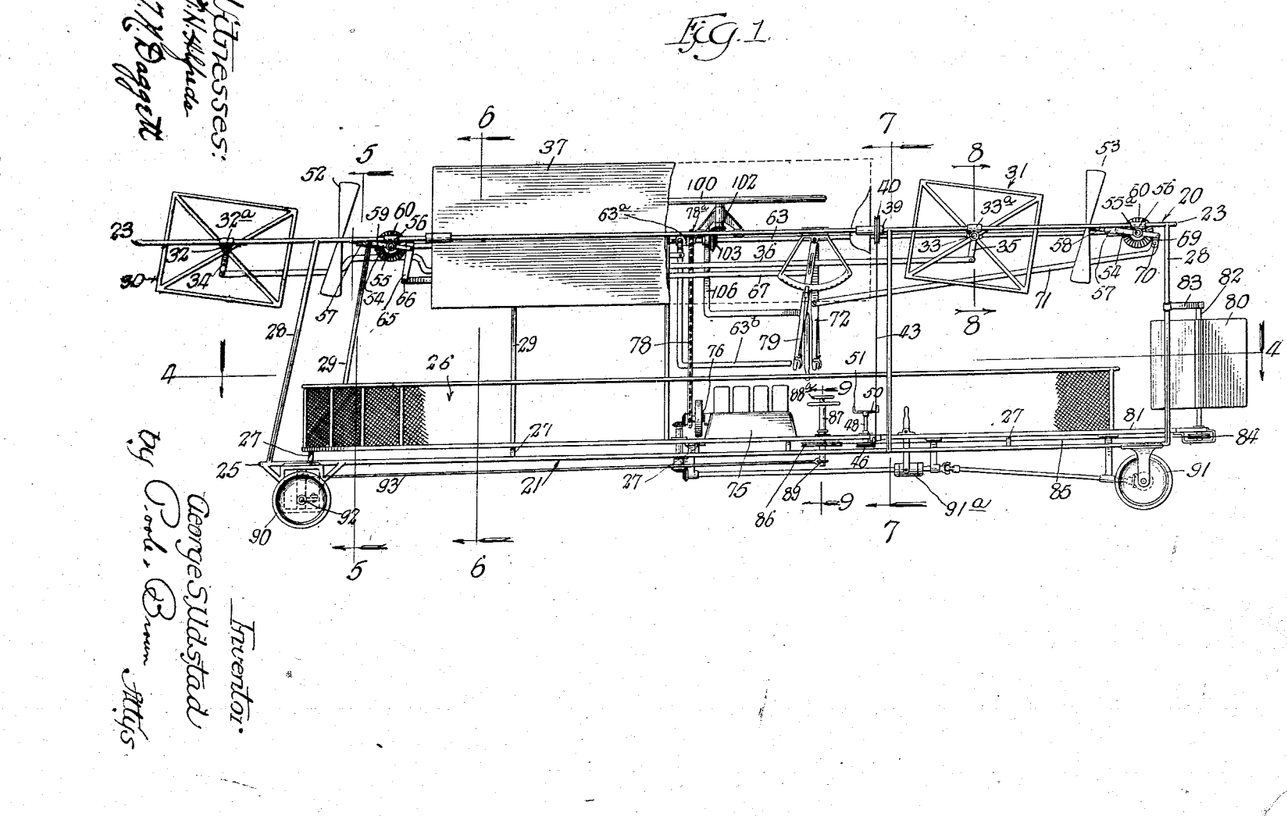
—Figure 1 is a side elevation of the machine.
Figure 3:
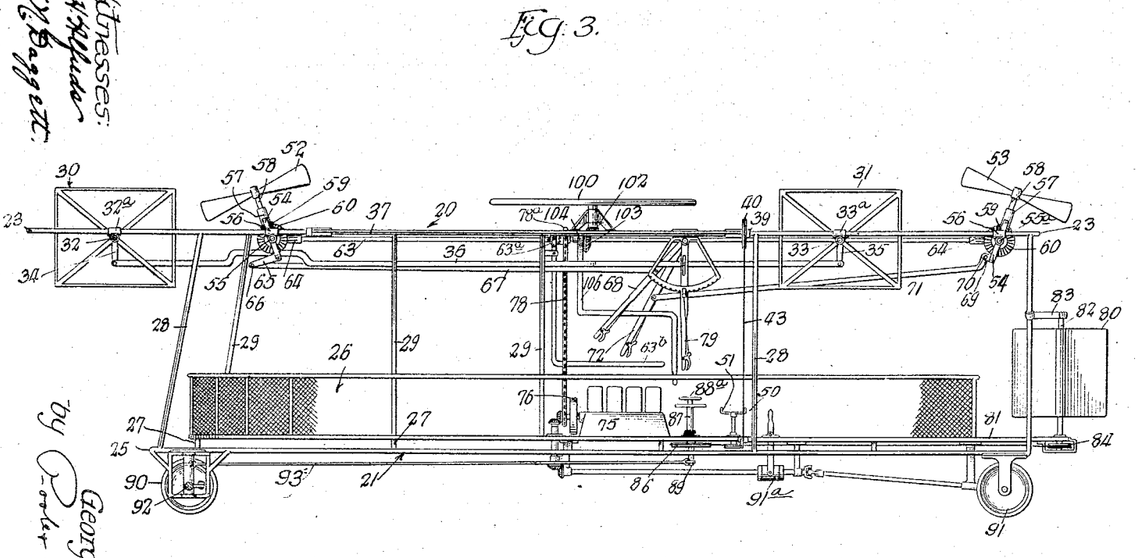
Fig. 3 is another side elevation of the machine, showing the aeroplanes and propellers in different positions from those shown in Fig. 1.
Figure 4:
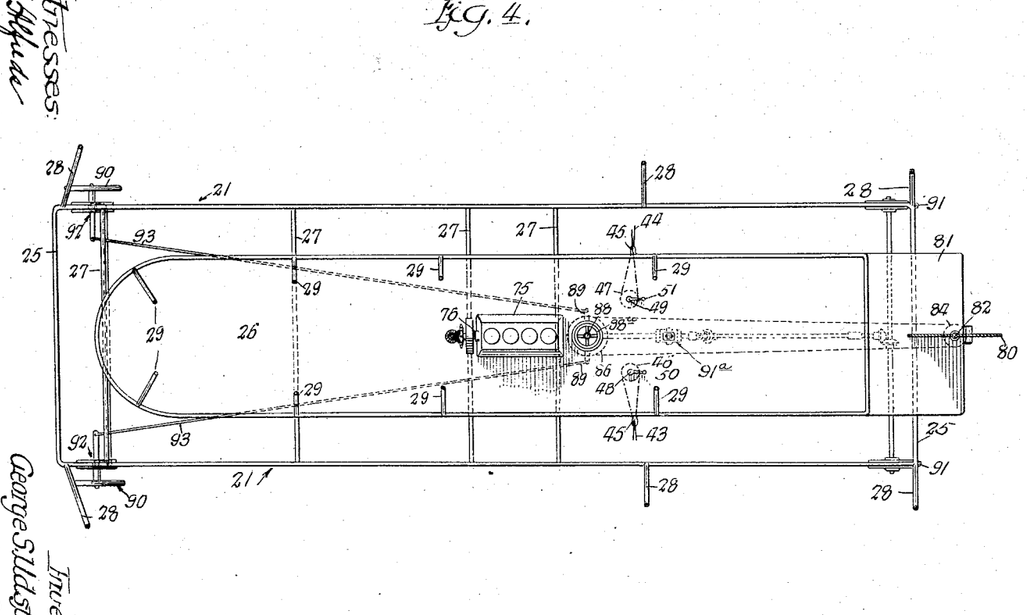
Fig. 4 is a longitudinal section through the machine on the line 4—4 of Fig. 1.
Figure 5:
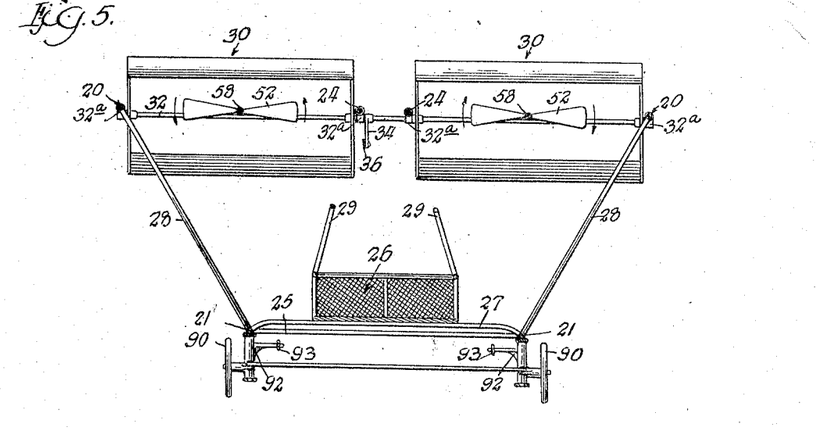
Fig. 5 represents a transverse section through Fig. 1 on the line 5—5 thereof.

The planes provided for lifting the machine are preferably made in the form of box kites. A pair of box kites 30 is located forward and another pair 31 is located aft of the machine. Said box kites, as shown, are of the two-plane type and are rotatively mounted upon the upper frame 20. 32, 33 represent transverse rock shafts upon which the pairs of box kites 30 and 31 are respectively mounted. Said shafts are journaled on the upper frame by means of sleeves 32$^a$ and 33$^a$. Depending rock arms 34, 35 are rigidly connected respectively to the rock shafts 32 and 33, and a rod 36 is pivotally connected at its opposite ends to each of said rock arms. This arrangement and connection of the box kites furnishes a means for rocking or oscillating them on their axes to present them at different angles to the currents of air and to manipulate them for rising or soaring therein. The rod 36 is given endwise movement to shift the box kites by means of an operating lever 79, which is pivotally hung from the frame 20, and is connected to said rod by means of a pin and slot as illustrated in Figs. 1 and 3.

37, 38 represent single planes which are rotatively mounted on the side members of the upper frame 21 with their axes at right angles to the axes of the box kites. Said planes are provided at their rear ends with projecting hubs 39, 40 to which are keyed, respectively, pulleys 41, 42. These pulleys are operated by endless bands or cords 43, 44 which pass around said pulleys and then downward through loops 45 which are secured to the bottom edges of the car body 26, whence they pass about pulleys 46, 47. These pulleys are secured, respectively, to vertical shafts 48, 49 which are journaled in any convenient manner in the bottom of the car body and have secured to their upper ends crank handles 50, 51 to operate them, and thus control the angular position of the planes 37, 38.

Figure 6:
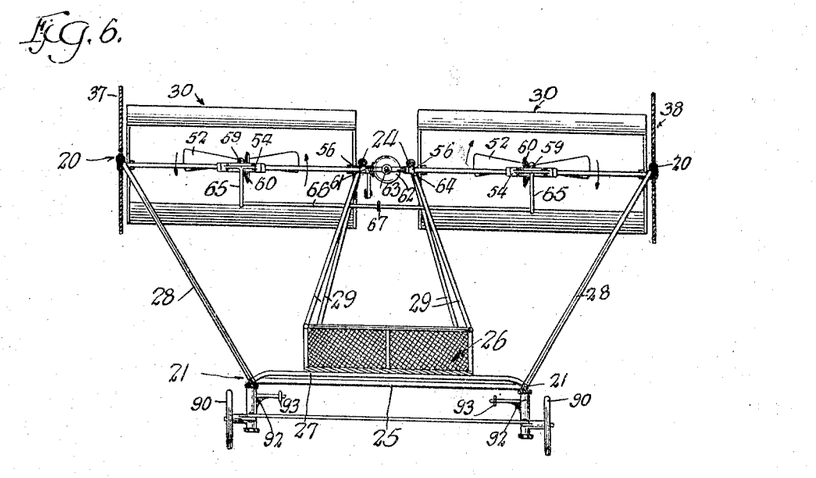
Fig. 6 is a similar section through Fig. 1 on the line 6—6 thereof.
Figure 7:
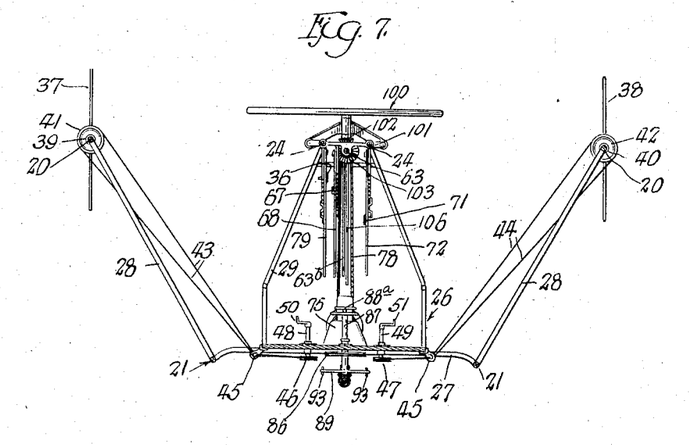
Fig. 7 is a partial transverse section through Fig. 1 on the line 7—7 thereof.
Figure 8:
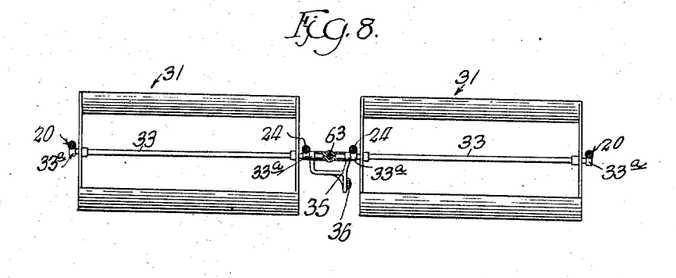
Fig. 8 is a partial transverse section through the operating shaft on the line 8—8 of Fig. 1.

52, 53 represent propellers of the usual two blade type located, respectively, fore and aft of the machine, the one pair 52 immediately in the rear of the fore box kites and the other pair 53 located immediately in the rear of the aft box kites. Each pair of propellers is preferably made right and left so as to rotate upwardly and outwardly away from the medial axis of the machine as indicated by the arrows in Fig. 6. Each of said propellers is mounted in substantially the same way, and the description of the mounting of one will apply to all.

Figure 2:
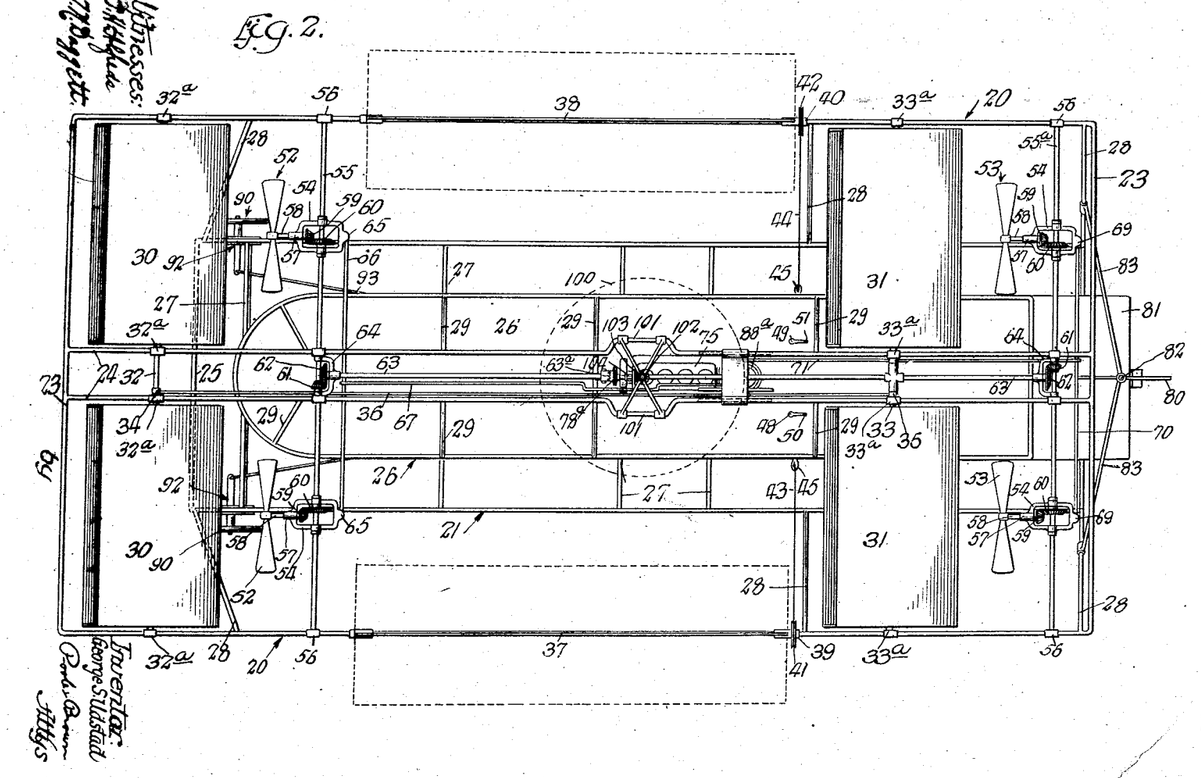
Fig. 2 is a top plan view of the same.

54 represents a frame (Figs. 1 and 2) rotatively mounted on a shaft 55 which is journaled on the side members of the upper frame 20 by means of sleeves 56. A long bearing 57 is formed in the forward side of the frame 54 for the shaft 58 of the propeller 52, said shaft being held from endwise movement by means of suitable sleeves. A beveled gear 59 of small diameter is keyed to the end of the shaft 58 within the frame 54 and meshes with another beveled gear of larger diameter 60 which is keyed to the shaft 55. It is apparent that the rotation of the shaft 55 will communicate its rotation to the propeller 52. A beveled gear 61 is keyed to the shaft 55 at a point between the longitudinal bracing members 24 of the frame 20. This gear meshes with a gear of larger diameter 62 which is keyed to the end of a shaft 63 located between the bracing members 24 and running in the direction of the length of the machine. The forward end of said shaft is supported by a suitable bracket 64 which is mounted on the journals supporting the shaft 55 where said shaft crosses beneath the bracing members 24. The shaft 63 extends rearwardly to the shaft 55$^a$ which operates the aft propellers, where it is similarly mounted and geared to said shaft, as in the case of the shaft 55, the like parts being indicated by the same numerals. It is apparent from this construction that rotation of the shaft 63 will impart rotation to both fore and aft propellers at a greatly increased speed. The forward frames 54 in which the forward propellers are journaled are each provided with a depending arm 65, each rigidly connected with said frame and connected together by a cross bar 66. 67 represents a connecting rod which is pivotally connected at one end to the cross bar 66 and at the other end to an operating lever 68 which is pivotally hung from the upper frame of the machine.

The rear propeller journal frames are provided with depending arms 69 which are connected together by a cross bar 70. A link 71 pivotally connects said cross bar with an operating lever 72 which is pivotally hung from the upper frame of the machine. It is apparent that by means of the operating levers 68 and 72, the journal frames for the propellers may be shifted on their axes so as to present the propellers at various angles. Each of the operating levers 68, 72 and 79 is provided with notched segments and spring controlled detents of the usual type by means of which said levers may be fixed in any desired position.

75 indicates the motor which may be of any suitable or desirable type. The motor shaft 76 is geared to the propeller operating shaft 63 by means of a sprocket chain 78 and sprocket wheel 78$^a$. A clutch 63$^a$ is preferably placed on the operating shaft 63 to engage and throw in or out of gear the sprocket wheel 78$^a$. This clutch is operated by a lever arm 63$^b$.

At the rear of the machine is located a rudder 80 which is in the form of a plane and is journaled along its vertical median line. The platform of the car is extended preferably, as at 81, to provide a support for the lower journal of the rudder shaft 82, which is journaled at its upper end in bracket arms 83 rigidly secured to the end hanger bars of the frame of the machine. The lower end of the rudder shaft is provided with a pulley 84 about which is passed an endless steering cord or band 85. This band or cord passes around a pulley 86 secured to the lower end of a vertical shaft 87 which is mounted in the car body just aft of the engine of the motor 75 (see Figs. 1 and 2). Said shaft is preferably made hollow to receive an inner shaft 88 which projects below the first named shaft and at its bottom is provided with a cross bar 89 which is for a purpose now to be described.

For running upon the ground the machine is provided with four wheels, the front wheels 90 and the rear wheels 91. The rear wheels are mounted in any usual way, and the front wheels are mounted on short hinged axles 92, as in the ordinary automobile construction. The inner ends of the short axles 92 are connected by light rods 93 with the ends of the cross bar 89 secured to the end of the steering shaft 88. It is thus apparent that the machine when running on the ground may be steered by means of the shaft 88 which is operated by the hand wheel 88$^a$.

Figures 9, 10, 11:
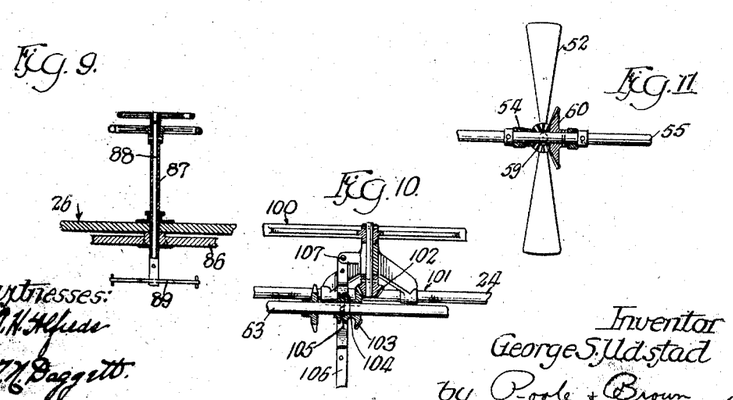
Fig. 9 is a vertical section through the steering gear.
Fig. 10 is a vertical section through the gyroscope to be used in connection with my machine.
Fig. 11 is a detail sectional view on an enlarged scale through the beveled pinion which immediately drives the propellers.

For steadying my machine, I prefer to provide it amidships and in its upper frame with a gyroscope which is normally operated by the motor. 100 indicates the gyroscope suitably mounted on the longitudinal brace bars 24 which are here spaced apart, as indicated at 101, to provide a suitable base for said gyroscope. The lower end of the shaft of the gyroscope is provided with a beveled gear 102 which meshes with a beveled gear 103 feathered to the operating shaft 63 (see Fig. 10.) The hub of the beveled gear is prolonged and provided with an annular groove 104 which is engaged by pins 105 in an operating lever 106 pivotally attached at 107 to a projecting arm on the frame of the gyroscope. By means of this arrangement the beveled gear 103 may be swung into and out of engagement with the beveled gear 102. Should for any reason the motor stop running, the gyroscope may be taken out of gear therewith by means of the arm or operating lever 106. The gyroscope would continue its movement until its momentum had been exhausted, and thus assist in steadying the machine.

Figure 12:
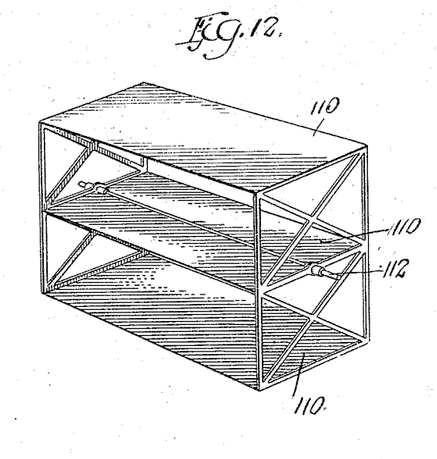
Figs. 12 and 13 show perspective views of modified box kites which may be used in connection with my machine.
Figure 13:
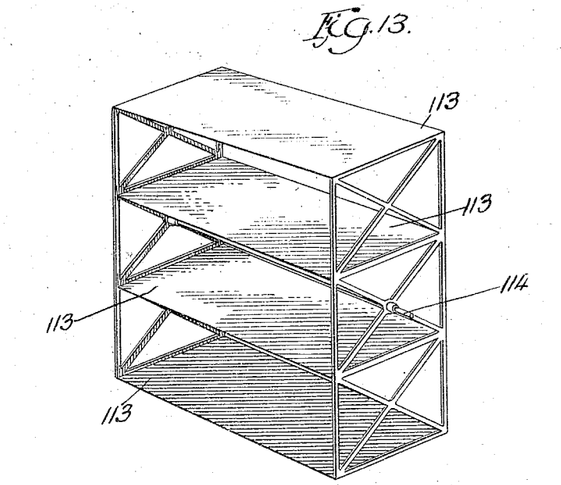

While I have shown in the drawings illustrating my machine box kites which have only two planes, it is apparent that box kites having three or more planes may be used. In Fig. 12 I have shown a box kite having three planes 110. In this case the shaft 112 of the aeroplane is located with its axis coincident with the median line of the middle plane. In Fig. 13 is illustrated an aeroplane having four planes 113 in which case the shaft 114 is located with its axis coincident with the line of intersection of diagonal planes passed through the outer edges of the kite.

Figure 14:
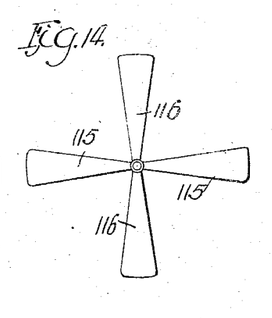
Figs. 14 and 15 show, respectively, end elevations of four and six blade propellers.
Figure 15:
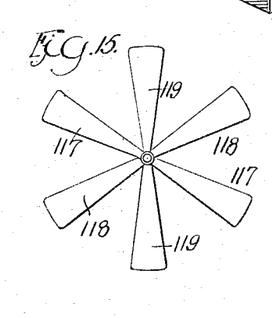
Figure 16:
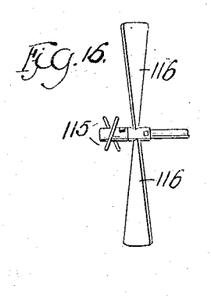
Figs. 16 and 17 represent, respectively, side elevations of said propellers.
Figure 17:
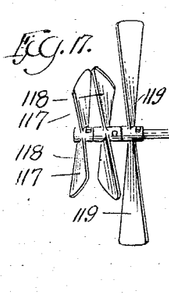

It may also be desirable to use propellers with more than two blades. In Figs. 14 and 16 is shown a propeller with four blades. Said blades are disposed at equal distances about the shaft but arranged, the one pair 115 in advance of the other pair 116. In Figs. 15 and 17 is shown a propeller with six blades. The blades as before are arranged symmetrically about the shaft, the oppositely disposed pairs of the blades 117, 118 and 119 arranged in tandem on the shaft, as indicated in side elevation in Fig. 17. In each case the successive pairs of blades are increased in pitch as indicated in the drawings.

To facilitate the starting of my flying machine, I prefer to gear the motor to the back wheels 91, so that it may be run along the ground under its own power. Any convenient or usual mechanism for thus gearing the motor to the rear wheels may be used, as for example, that illustrated in the drawings. Any usual clutch as indicated at 91ᵃ is used to throw this mechanism into or out of gear with the motor.

In operation in order to rise gently in the air, the fore and aft box kites are shifted on their axes by means of the operating lever 79 into about the position indicated in Fig. 1. The lateral planes 37, 38 are shifted to a vertical position, and the propellers 52, 53 brought to the position indicated in said figure. Under the action of the ground wheels, which has given the machine a flying start, and under the action of the propellers, and by reason of the upward slope of the planes of the box kites, the machine is lifted from the ground and starts on its flight through the air. It is apparent that the angle at which it rises is determined by the angular position of the fore and aft box kites. After the machine has risen in the air, when it is desired to move in a horizontal plane, the box kites, both fore and aft, are shifted so that their planes assume an approximately horizontal position.

In order to stop the machine, the box kites, propeller shafts, and the lateral planes are brought into the position indicated in Fig. 3, in which the planes of the box kites are shown in horizontal planes as are also the lateral planes 37, 38 while the fore propellers are directed upward and forward, and the aft propellers upward and rearward. It is apparent that in this position of the several parts, the machine will neither advance nor move backward, but will be maintained in a fixed position, being supported therein by the downward pressure of the propellers and by the supporting capacity of the planes of the box kites and of the lateral planes.

It is to be noted that all of the operating levers, the steering gear and the motor are located amidships and together so as to be conveniently at the hand of the operator. The machine may thus be readily manipulated by one person.

While I have shown and described certain details of mechanical construction, it is to be understood that I do not limit myself to these details, as it is evident that they may be modified in various ways without departing from the spirit of the invention.

I claim as my invention:—

1. In a flying machine, in combination with the frame, box kites rotatively mounted fore and aft of the frame with their axes at right angles to the longitudinal axis of the machine, propellers carried by the frame at the rear respectively of the fore and aft box kites, shafts to which said propellers are secured, said shafts being arranged to have oscillatory movement in vertical planes parallel to the axis of the machine, a driving shaft geared to said propeller shafts, and means for independently oscillating said shafts, together with the mechanism for shifting said box kites on their axes.

2. In a flying machine, in combination with the frame, sets of box kites mounted respectively fore and aft on the frame of said machine with their axes arranged at right angles to the longitudinal axis of said machine, sets of propellers mounted, one set immediately aft of the forward set of box kites and the other set immediately aft of the rear set of box kites, shafts upon which said propellers are mounted, the shafts of each set being arranged in the same plane and being mounted to oscillate in unison in vertical planes parallel to the axis of the machine, a driving shaft geared to said propeller shafts, means for oscillating the shafts of each set of propellers, each set independently of the other, and mechanism for shifting said box kites on their axes.

3. In a flying machine, the combination with the frame, sets of box kites mounted respectively fore and aft on the frame of said machine with their axes arranged at right angles to the longitudinal axis of said machine, mechanism for shifting said box kites on their axes, sets of propellers mounted, one set immediately aft of the forward set of box kites and the other set immediately aft of the rear set of box kites, shafts upon which said propellers are mounted, the shafts of each set being arranged in the same plane and mounted to oscillate in unison in vertical planes parallel to the axis of the machine, a drive shaft geared to said propeller shafts, means for oscillating the shafts of each set of propellers, each set independently of the other, a gyroscope mounted on the frame of the machine amidships, gearing intermediate said gyroscope and said drive shaft, and clutch mechanism adapted to throw said gyroscope into or out of gear with said drive shaft.

4. In a flying machine, in combination with the frame, sets of box kites mounted respectively fore and aft on said frame with their axes arranged at right angles to the longitudinal axis of said frame, mechanism for shifting said box kites on their axes, sets of propellers mounted, one set immediately aft of the forward set of box kites and the other set immediately aft of the rear set of box kites, shafts upon which said propellers are mounted, the shafts of each set being arranged in the same plane and being mounted to oscillate in unison in vertical planes parallel to the axis of the machine, a driving shaft geared to said propeller shafts, means for oscillating the shafts of the sets of propellers, each set independently of the other, laterally arranged planes rotatively mounted on the frame of the machine with their axes of rotation parallel with the axis of the machine, and means for oscillating said planes.

In testimony, that I, claim the foregoing as my invention I affix my signature in the presence of two witnesses this 7th day of June, A. D. 1909.

GEORGE S. UDSTAD.

Witnesses:
 HUGO E. KNOTH,
 FRANK J. HAGGERTY.